United States Patent [19]

Coran

[11] Patent Number: 5,051,480
[45] Date of Patent: Sep. 24, 1991

[54] ELASTOMERIC BLENDS

[75] Inventor: Aubert Y. Coran, Akron, Ohio

[73] Assignee: Monsanto Company, St. Louis, Mo.

[21] Appl. No.: 421,431

[22] Filed: Oct. 16, 1989

[51] Int. Cl.$^5$ .................. C08L 9/02; C08L 13/00; C08L 15/02

[52] U.S. Cl. .................. 525/227; 524/506; 524/520; 524/523; 525/230

[58] Field of Search ............ 525/227, 230; 524/520, 524/533, 506; 523/351

[56] References Cited

U.S. PATENT DOCUMENTS

| | | | |
|---|---|---|---|
| 3,873,494 | 3/1975 | Lewis | 260/42.37 |
| 4,286,023 | 8/1981 | Ongchin | 428/516 |
| 4,591,615 | 5/1986 | Aldred et al. | 525/179 |
| 4,656,219 | 4/1987 | Oyama et al. | 524/481 |
| 4,687,810 | 8/1987 | Coran | 525/74 |
| 4,725,637 | 2/1988 | Fernyhough et al. | 524/271 |

FOREIGN PATENT DOCUMENTS 0194030  9/1986  European Pat. Off. .
2487369  1/1982  France .
1284082  8/1972  United Kingdom .

OTHER PUBLICATIONS

Blends of Polyacrylate Rubber ... 1. Antal et al. Int'l Pol. Sci. & Technol. 5 11 (1978).

*Primary Examiner*—Allan M. Lieberman
*Attorney, Agent, or Firm*—Gordon B. Seward

[57] ABSTRACT

Compositions of acrylic rubber and another rubber which can be nitrile rubber, hydrogenated nitrile rubber, fluoroelastomer, silicon rubber, or fluorosilicone rubber are described, in which the acrylic rubber can be uncured or at least partially crosslinked. The compositions are millable and processable and, by the addition of curatives for the nitrile rubber, hydroganted nitrile rubber, fluoroelastomer, siloicone rubber, or fluorosilicone rubber, can be further crosslinked to become vulcanizates which exhibit excellent resistance to the effects of hot air, hot oil, and ozone. The acrylic rubber is a copolymers from alkyl acrylate monomer which copolymer contains no crosslinking sites other than acrylate ester sites, and can be crosslinked by reaction with a paraffinic alcohol.

19 Claims, No Drawings

ELASTOMERIC BLENDS

BACKGROUND OF THE INVENTION

This invention relates to elastomeric blends and to a method for making them. The blends comprise acrylic rubber and another elastomer which can be nitrile rubber, hydrogenated nitrile rubber, a fluoroelastomer, a silicone rubber or a fluorosilicone rubber. The elastomer compositions all have excellent resistance to the degrading effects of oil and heat.

Elastomers which possess superior properties with regard to service temperature and low oil-swell are often referred to as "extreme-service" elastomers. Typical of these materials are fluorocarbon rubbers, fluorosilicone rubbers and silicone rubbers. A principal drawback of these materials is their high cost.

Other elastomers, such as nitrile rubber, have excellent oil-swell properties, but do not have high service temperatures. Still others, such as acrylic rubber, have fairly high service temperatures as well as very good oil resistance.

A desirable result, therefore, is a blend of elastomers which can produce a composition which has the properties of resistance to both heat and oil at a reasonable cost.

BRIEF SUMMARY OF THE INVENTION

It has now been discovered that the desirable properties of oil-resistance and high service temperature in a blend of elastomers can be realized in a composition which comprises from 10 to 90 parts by weight of acrylic rubber and, correspondingly, 90 to 10 parts by weight of another elastomer which is nitrile rubber, hydrogenated nitrile rubber, a fluoroelastomer, a silicone rubber or a fluorosilicone rubber. In preferred blends, the acrylic rubber in the blend is in the form of vulcanized or crosslinked particles, of an average diameter below 50 micrometers ($\mu$m). This preferred blend is vulcanizable and millable, and can be further compounded with vulcanizing agents for the other rubber and vulcanized into useful objects.

Such a preferred blend can be prepared by first forming a mixture of the acrylic rubber and the other rubber in the desired ratio, and then masticating the mixture in the presence of an agent which will crosslink the acrylic rubber but not the other rubber, at a vulcanization temperature for the acrylic rubber, for a sufficient time to achieve at least partial vulcanization of the acrylic rubber. In a subsequent step, the mixture so produced can then be combined with a vulcanization agent for the other rubber, and the mixture can then be shaped and vulcanized, for example, in a mold. The finished product of this subsequent step exhibits physical properties, such as tensile strength, which are superior to the properties of similar compositions made by simply blending the acrylic rubber with the other rubber and vulcanizing the blend. However, the simple blends can be useful as well, and show superior retention of properties on heat-aging.

PREFERRED EMBODIMENTS OF THE INVENTION

The acrylic rubbers of the invention are elastomeric polymers or copolymers which are polymerizates from one or more alkyl acrylate or alkoxy acrylate monomers and which polymers or copolymers contain no crosslinking sites other than acrylate ester sites. These acrylic rubbers (or elastomers) include polymers from ethyl acrylate or other alkyl acrylates or copolymers of ethyl acrylate or with other alkyl acrylates and are herein referred to as "ACR" elastomers, as distinguished from copolymers made from acrylate monomers and other monomers containing crosslinking sites, which have the ASTM designation "ACM." These ACR acrylic elastomers are discussed briefly in the *Encyclopedia of Polymer Science and Engineering,* (2nd Edition), Wylie-Interscience, Vol. 1, pages 306–334, under the section on "Acrylic Elastomers," although most of that section deals with ACM elastomers. Also, the section of the same volume entitled "Acrylic and Methacrylic Ester Polymers," pages 234–305, contains some information on the preferred elastomers of the invention, although most of the section is devoted to methacrylic ester polymers.

The acrylic elastomers of the invention, those polymers and copolymers from one or more alkyl acrylate monomers, have found limited acceptance because of the difficulties in crosslinking them. In contrast, ACM elastomers, which contain chlorine, epoxy or hydroxyl crosslinking sites, are in widespread use, and can be regarded as "improvements" on the ACR elastomers because of their relatively ease of crosslinking. The ACR elastomers, however, are much less expensive, and often exhibit greater resistance to aging than the ACM elastomers.

ACR elastomers can be prepared by emulsion polymerization of acrylic esters according to the method described by W. C. Mast and C. H. Fisher in Industrial and Engineering Chemistry 41, 4, pages 790–797 (1949). Homopolymers from methyl acrylate are not rubbery; polymers from higher alkyl acrylates tend to be softer and gummier. Thus ethyl acrylate polymers are preferred, either homopolymers from ethyl acrylate or copolymers with butyl acrylate.

Nitrile rubber (NBR) used in the compositions of the invention is a copolymer from 1,3-butadiene and acrylonitrile. The relative proportions of these monomers determine some of the properties of the polymers. Typical NBR has an acrylonitrile content of 50% or less, usually at least 25%. Higher levels of acrylonitrile result in polymers which have greater oil resistance; lower levels of acrylonitrile result in rubbers which are softer and more flexible at lower temperatures. Commercially available NBR types are listed in the 1989 Rubber World Blue Book on pages 434–454. Hydrogenated NBR elastomers, in which the level of the olefinic unsaturation in the chains has been reduced, exhibit improved resistance to heat-aging, and are also useful in the compositions of the invention.

Fluoroelastomers used in the compositions of the invention are rubbery polymers and copolymers from fluorocarbon monomers. These materials are described in the Wylie-Interscience *Encyclopedia of Polymer Science and Engineering,* (2nd Edition) in Volume 7 at pages 257–269. These elastomers are characterized by their excellent resistance to a variety of chemicals, oils and fuels, and their flexibility and service life at extreme temperatures. Typical fluoroelastomers are copolymers from vinylidene fluoride with other fluorocarbon, chlorofluorocarbon or hydrocarbon monomers or other cure-site monomers. The term 37 fluoroelastomer" includes perfluoroelastomers, as well. A list of commercially available fluoroelastomers can be found in the 1989 Rubber World Blue Book on pages 424–430.

Silicone elastomers used in the compositions of the invention are rubbery materials, usually based on polydimethylsiloxanes which contain reactive groups as cure sites. Based on the nature of these cure sites, the crosslinking agent and optimum time and temperature for crosslinking are determined. A detailed discussion of silicone elastomers can be found in the Wylie-Interscience *Encyclopedia of Polymer Science and Engineering,* (2nd Edition) in Volume 15 at pages 271–289. A list of commercially available silicone elastomers can be found in the 1989 Rubber World Blue Book at pages 472–480. While many of the cure systems for silicone elastomers are active at room temperature, and often used in adhesives and sealants, other such elastomers have heat-curing systems which require elevated temperatures for crosslinking. A typical silicone elastomer compound will include a substantial amount of filler, usually a silica filler.

Fluorosilicone elastomers can be considered a special variation of silicone elastomers which contain fluorocarbon substituents. Some commercially available fluorosilicone elastomers are included in the Blue Book entries for fluoroelastomers. As may be assumed, these materials lend some of the qualities of a fluoroelastomer to the basic properties of the silicone materials.

The preferred compositions of the invention feature a dispersion of vulcanized particles of ACR elastomer in a continuous matrix of another elastomer, selected from the elastomers listed above. That is, the matrix elastomer forms the continuous phase and the acrylic elastomer the disperse phase in a two-phase system. The particles of the ACR elastomer are small, having an average diameter below 50 micrometers ($\mu$m). Desirably, their average diameter is below 20 $\mu$m, and preferably it is below 10 $\mu$m. It is thought that the vulcanized state of these ACR elastomer particles enables them to retain their integrity in the dispersion, and reduces their tendency to agglomerate. Experience has shown that particles much larger than about 50 $\mu$m tend to act as flaws in the final product, thus adversely affecting some of their physical properties, such as tensile strength or tear strength.

The compositions of the invention contain ACR elastomer and another elastomer selected from nitrile rubber, hydrogenated nitrile rubber, fluoroelastomers, silicone rubber and fluorosilicone elastomers, in a proportion, based on 100 total parts by weight of both elastomers, so that at least 10 parts by weight, but no more than 90 parts by weight of each is present. Preferably, the ACR elastomer makes up from 20 to 60 parts, with correspondingly, 80 to 40 parts of the other elastomer; more preferably, the compositions contain 25 to 50 parts of the ACR elastomer and 50 to 75 parts of the other elastomer. Within the above proportions, the compositions are capable of exhibiting the good qualities of both component elastomers. It is understood that the term "other elastomer" can mean a mixture of the other elastomers herein disclosed.

The preferred compositions of the invention can be prepared advantageously by a process which generally involves forming an intimate mixture of the elastomers in the recommended proportions, and masticating the mixture, in the presence of a crosslinking agent for the ACR elastomer (but not for the other elastomer), at a crosslinking temperature for the ACR elastomer, for a time sufficient to achieve at least partial crosslinking of the ACR elastomer. This process will produce a dispersion of (at least partially) crosslinked ACR elastomer dispersed in a continuous matrix of the other (uncured) elastomer. Then, if desired, in a subsequent step, crosslinking agent for the other elastomer can be added, and the composition can be shaped and the final crosslinking accomplished. Shaping can be by calendering, extrusion or molding, followed by curing or crosslinking, usually with the application of heat, often under pressure.

ACR elastomers have been crosslinked (or vulcanized) by a variety of methods. Semegen and Wakelin (Rubber Chem. & Technol. 25 582-595,1952) used sodium metasilicate or lead oxide, among other crosslinking agents. Schultz and Bovey (Journal of Polymer Science 22, 485–494, 1956) show crosslinking of polyacrylates with electron irradiation. Breslow U.S. Pat. No. 3,284,421 discloses the use of azidoformate compounds to cure poly(ethylacrylate), among other polymers. Any of these methods can be used to crosslink the ACR elastomers of the invention.

A preferred mechanism for crosslinking the ACR elastomers of the invention is by transesterification of the pendant ester groups by paraffinic alcohols in the presence of a catalyst. Preferred alcohols for this process are $C_{2-12}$ diols, especially 1,6-hexanediol, diethylene glycol and triethylene glycol. Higher molecular-weight polyglycols are also useful, e.g. 1000–4000 molecular weight polyethylene glycol. The transesterification reaction was described by Bouilloux, Druz and Lambla in Polymer Process Engineering 4(2–4)235–251 (1986) as useful in modifying ethylene-vinylacetate copolymers. There, poly(vinylacetate) was converted to a vinyl alcohol polymer during reactive processing in an extruder. Monomeric acetate ester was a by-product. The method of the invention differs in that, under similar process conditions, the diol moiety becomes the bulk of the crosslink, and the by-product is a lower alkyl alcohol. Since the alcohol is easily removed at processing temperatures the reaction can quickly be driven to completion. Preferred catalysts for the method of the invention are glycol-soluble metal salts or oxides, usually of tin, zinc, manganese, cobalt or calcium, such as, for example, dibutyltin dilaurate or dibutyltin diacetate or a polymer of dioctyltin maleate. Sodium methoxide is also recommended for this use.

Other compounding ingredients will be used in the compositions of the invention as dictated by the nature of the elastomers employed and the requirements of the final compositions. Optionally, therefore, oils, softeners, plasticizers, fillers, antidegradants and colorants can be added to one or both elastomers, as well as crosslinking agents for each.

Mixing of the elastomers, admixture of the crosslinking agents and other compounding ingredients, and mastication of the mixture during crosslinking of the acrylic elastomer can all be performed on conventional rubber-mixing equipment, such as Banbury mixers, Brabender mixers, rubber mills and mixing extruders. Conventional mixing rates, temperatures and procedures are employed.

A more complete understanding of the invention can be obtained by reference to the following examples, in which all parts are by weight and all temperatures are in degrees celsius unless otherwise indicated.

EXAMPLE 1

An ACR elastomer was first prepared by emulsion polymerization of a 70/30 (by weight) mixture of ethyl acrylate/butyl acrylate, by the following procedure:

Deionized water (1855g) and a 10% solution of Dowfax ® ZAl (5.76g), a surfactant, were charged to a five-liter, three-necked flask, fitted with an addition funnel, a heating mantle, a thermometer and a stirrer with a "half-moon" blade. This mixture was gradually heated to 65° C. under agitation, and sparged for 15 minutes with nitrogen. Then 130g of a 2.5% solution of potassium persulfate, 432g butyl acrylate and 1008g ethyl acrylate were continuously charged to the flask over a period of three hours. During this time, additional surfactant, comprising 288g of a 10% Dowfax 2Al solution and 29g of a 5% sodium bicarbonate solution, was also continuously charged. About midway through the reaction, an additional 29g of 2.5% potassium persulfate was added. After all of the ingredients were in, the mixture was stirred for an additional two hours and then cooled to room temperature. The latex product was then alum-coagulated in an excess of water, and the coagulum was dried at room temperature. The product of this preparation was used to prepare the blends set forth in the following examples, and is therein referred to as "ACR70E."

EXAMPLE 2

In order to evaluate compositions of the invention containing dynamically vulcanized ACR blended with NBR, the following experiments were performed.

Silica-filled masterbatches of NBR (Krynac ® 34.5 from Polysar) and ACR elastomer (the product of Example 1 -ACR70E) were prepared, according to the recipes of Table I, by using a size 00 Banbury mixer according to usual procedures. The Krynac 34.5 was chosen because of its exceptionally good hot-air aging resistance. The choice of ACR70E was a compromise between low-temperature flexibility and high tensile strength. Eight masterbatches were prepared with different levels of filler. A small amount of a silane was included with the silica. Curatives for the ACR were included in the ACR masterbatches.

By using various combinations and proportions of the masterbatches made according to Table I, eighteen compounds were prepared, each containing a ratio of ACR/NBR of 40/60, 50/50 or 60/40, and containing various levels of silica distributed in the NBR and the ACR. These compounds were then mixed in the Brabender mixer to produce a series of blends or the rubbers and to effect dynamic vulcanization of the ACR in each case. The temperature of dynamic vulcanization was targeted to exceed 200° C.; actual temperatures ranged from 202° to 212° C. The compounds were then cooled, and further compounded in a Brabender mixer, keeping the temperature below 100° C. Each composition was compounded with 3.00 parts (per 100 parts total rubber) of Stangard 500 antidegradant. As curatives for the NBR, the following materials were then admixed:

| Material | Parts per 100 parts NBR |
| --- | --- |
| Magnesium Oxide | 6.00 |
| Zinc Oxide | 3.00 |
| HVA-2 | 1.20 |
| DICUP-40C | 0.60 |

HVA-2 is meta-phenylenebismaleimide; and DICUP-40C is 40% dicumyl peroxide.

The compositions were then press-cured at 180° C. for 60 minutes, and the cured samples were tested for physical properties, including hardness, stress-strain values, tension set and volume swelling oil, all according to ASTM D2000 or SAE J200 standard test methods for elastomeric materials. Samples were aged 72 hours at 150° C., and the physical properties of the aged samples were tested and compared with the results for the unaged samples. The compositions and data are set forth in Table II.

All the compositions in Table II were also tested for resistance to ozone degradation, and all gave excellent results.

TABLE I

| Masterbatch | A | B | C | D | E | F | G | H |
| --- | --- | --- | --- | --- | --- | --- | --- | --- |
| Krynac 34.5 | 100 | 100 | 100 | — | — | — | — | — |
| ACR70E | — | — | — | 100 | 100 | 100 | 100 | 100 |
| Hisil 233 | 25 | 40 | 60 | 0 | 15 | 30 | 45 | 60 |
| Silane A-189 | 0.5 | 0.5 | 0.5 | 0 | 0.5 | 0.5 | 0.5 | 0.5 |
| Hexamethylenediol | — | — | — | 1 | 1 | 1 | 1 | 1 |
| Dibu.tin Diacetate | — | — | — | 3 | 3 | 3 | 3 | 3 |
| Stearic Acid | — | — | — | 2 | 2 | 2 | 2 | 2 |
| Total | 125.5 | 140.5 | 160.5 | 106 | 121.5 | 136.5 | 151.5 | 166.5 |

TABLE II

| Composition | 1 | 2 | 3 | 4 | 5 | 6 | 7 | 8 | 9 |
| --- | --- | --- | --- | --- | --- | --- | --- | --- | --- |
| % ACR | 40 | 40 | 50 | 50 | 50 | 60 | 60 | 40 | 50 |
| PHR ACR Filler | 15 | 45 | 0 | 30 | 60 | 15 | 45 | 30 | 15 |
| PHR NBR Filler | 25 | 25 | 25 | 25 | 25 | 25 | 25 | 40 | 40 |
| A Hardness | 63 | 70 | 62 | 67 | 79 | 65 | 76 | 72 | 65 |
| UTS, MPa | 14.7 | 16.7 | 12.8 | 16.4 | 15.4 | 14.1 | 15.7 | 16.3 | 15.5 |
| M100, MPa | 1.0 | 2.9 | 2.3 | 2.9 | 5.3 | 2.7 | 4.2 | 3.1 | 2.7 |
| UE, % | 472 | 485 | 401 | 464 | 316 | 443 | 425 | 474 | 469 |
| Tension Set, X | 2.0 | 4.0 | 3.5 | 3.0 | 3.5 | 4.0 | 4.5 | 2.5 | 3.0 |
| Vol. Sw., % @ 150° | 25.5 | 32.3 | 29.7 | 22.1 | 19.3 | 23.3 | 24.8 | 22.9 | 24.7 |
| Properties After 72 Hrs. @ 150° C. | | | | | | | | | |
| A Hardness | 74 | 79 | 75 | 77 | 87 | 78 | 86 | 80 | 78 |
| UTS, MPa | 15.3 | 17.9 | 12.8 | 16.5 | 16.0 | 13.8 | 15.2 | 17.4 | 13.9 |
| M100, MPa | 5.7 | 8.4 | 7.7 | 9.4 | 14.5 | 9.5 | 16.6 | 8.6 | 8.7 |
| UE, % | 231 | 212 | 160 | 175 | 107 | 146 | 115 | 204 | 154 |
| Chg. in Hardness | 11 | 9 | 13 | 10 | 8 | 13 | 10 | 8 | 13 |
| % Ret. of UTS | 104 | 107 | 100 | 101 | 104 | 98 | 97 | 107 | 90 |
| % Ret. of M100 | 549 | 293 | 336 | 319 | 275 | 358 | 400 | 275 | 316 |

TABLE II-continued

| % Ret. of UE | 49 | 44 | 40 | 38 | 34 | 33 | 27 | 43 | 33 |
|---|---|---|---|---|---|---|---|---|---|
| Composition | 10 | 11 | 12 | 13 | 14 | 15 | 16 | 17 | 18 |
| % ACR | 50 | 60 | 40 | 40 | 50 | 50 | 50 | 60 | 60 |
| PHR ACR Filler | 45 | 30 | 15 | 45 | 0 | 30 | 60 | 15 | 45 |
| PHR NBR Filler | 40 | 40 | 60 | 60 | 60 | 60 | 60 | 60 | 60 |
| A Hardness | 76 | 73 | 79 | 82 | 65 | 75 | 86 | 66 | 85 |
| UTS, MPa | 16.3 | 14.8 | 15.7 | 16.6 | 15.6 | 16.6 | 15.7 | 15.0 | 16.3 |
| M100, MPa | 3.8 | 3.6 | 3.1 | 3.9 | 2.3 | 3.5 | 4.0 | 2.8 | 4.8 |
| UE, % | 399 | 409 | 500 | 461 | 528 | 527 | 533 | 526 | 501 |
| Tension Set, X | 4.0 | 4.0 | 4.5 | 3.0 | 2.5 | 4 | 4.5 | 3 | 5 |
| Vol. Sw., % @ 150° | 20.7 | 24.2 | 22.4 | 21 | 27.2 | 21.7 | 21.4 | 21 | 20.6 |
| Properties After 72 Hrs. @ 150° C. | | | | | | | | | |
| A Hardness | 86 | 82 | 87 | 89 | 75 | 87 | 90 | 80 | 90 |
| UTS, MPa | 16.0 | 14.2 | 14.1 | 16.9 | 16.9 | 17.2 | 15.2 | 14.9 | 15.8 |
| M100, MPa | 11.2 | 12.2 | 8.0 | 9.1 | 6.6 | 10.7 | 9.8 | 9.7 | 14.3 |
| UE, % | 143 | 114 | 174 | 189 | 238 | 170 | 168 | 152 | 120 |
| Chg. in Hardness | 10 | 9 | 8 | 7 | 10 | 12 | 4 | 14 | 5 |
| % Ret. of UTS | 99 | 96 | 90 | 102 | 108 | 103 | 97 | 99 | 97 |
| % Ret. of M100 | 297 | 338 | 259 | 236 | 290 | 304 | 245 | 347 | 300 |
| % Ret. of UE | 36 | 28 | 35 | 41 | 45 | 32 | 32 | 29 | 24 |

Heat-aging for 72 hours at 150° C. increased the hardness and 100% modulus of all samples, but all compositions retained useful properties.

EXAMPLE 3

In order to compare a dynamic vulcanizate with a simple blend, two compositions were prepared, one by the method of Example 2, and the other by omitting the curatives for the ACR rubber and the dynamic vulcanization step. Both compositions contained a 50/50 blend of NBR (Krynac 34.5) and ACR (from Example 1), together with 15 phr of silica filler and curatives for the NBR. Dibutyltin dilaurate (DBTDL) was used instead of dibutyltin diacetate. Both samples were press-cured 30 minutes at 180° C. The complete recipe and the test results on the two compositions are set forth in Table III.

The test results show that, although the simple blend (Composition 20) had initial properties generally poorer than the dynamically cured blend (Composition 19), on heat aging the simple blend retained its rubbery properties, and appeared to be much less affected by the degrading effects of 150° aging.

TABLE III

| Composition | 19 | 20 |
|---|---|---|
| ACR70E | 50 | 50 |
| Krynac 34.5 | 50 | 50 |
| 1,6-Hexanediol | 0.5 | — |
| DBTDL | 1.5 | — |
| HiSil 233 | 15 | 15 |
| Silane A-189 | 0.5 | 0.5 |
| Maglite D | 5 | 5 |
| Zinc Oxide | 2.5 | 2.5 |
| Stangard 500 | 2.5 | 2.5 |
| HVA-2 | 1.5 | 1.5 |
| DiCup 40C | 0.5 | 0.5 |
| Physical Properties | | |
| Hardness, A | 58 | 54 |
| UTS, MPa | 10.6 | 5.9 |
| M100, MPa | 1.9 | 0.9 |
| UE, % | 407 | 603 |
| Ten. Set, % | 2.0 | 3.5 |
| Oil Swell, % | 48.1 | 52.1 |
| After 72 Hours Aging at 150° C.: | | |
| Hardness, A | 70 | 60 |
| UTS, MPa | 11.9 | 7.4 |
| M100, MPa | 4.9 | 1.5 |
| UE, % | 190 | 414 |

EXAMPLE 4

To investigate blends of ACR rubber with hydrogenated nitrile rubber, a 50/50 blend of ACR 70E and Zetpol 2010 was prepared, similarly to the compositions in Example 2. Zetpol 2010 is described by its manufacturer as containing 36% bound acrylonitrile, having an iodine value of 11g/100g and a Mooney viscosity (ML1+4,100° C.) of 85. Two compositions were prepared, both dynamically vulcanized at a temperature of 220° C. Composition 21 was prepared according to the procedure of Example 2. Composition 22 was prepared in the same way, except that dynamic vulcanization was performed under a nitrogen blanket, to minimize the degradation of the hydrogenated NBR. The complete recipe and the test results are set forth in Table IV.

The results in Table IV indicate that compared to the compositions in Table II, hydrogenated nitrile rubber gives compositions which are initially somewhat inferior to nitrile rubber compositions, but which retain their properties much better upon aging. Also, it appears that it is beneficial to perform the dynamic vulcanization step under a nitrogen blanket.

TABLE IV

| Composition | 21 | 22 |
|---|---|---|
| ACR70E | 50 | 50 |
| Zetpol 2010 | 50 | 50 |
| HiSil 233 | 25 | 25 |
| Nitrogen Blanket | No | Yes |
| Hexanediol | 1.0 | 1.0 |
| Diethyleneglycol | 2.2 | 2.2 |
| DBTDA | 1.0 | 1.0 |
| Stangard | 2.0 | 2.0 |
| HiSil 233 | 10 | 10 |
| Maglite D | 5.0 | 5.0 |
| Zinc Oxide | 2.5 | 2.5 |
| Stearic Acid | 1.0 | 1.0 |
| HVA-2 | 1.0 | 1.0 |
| DiCup 40C | 0.5 | 0.5 |
| Physical Properties | | |
| Hardness, A | 75 | 75 |
| UTS, MPa | 4.9 | 5.2 |
| M100, MPa | 3.0 | 2.5 |
| UE, % | 427 | 503 |
| Oil Swell, % | 23.3 | 27.1 |
| After 72 Hours Aging at 150° C.: | | |
| Hardness, A | 81 | 81 |
| UTS, MPa | 10.1 | 10.1 |
| M100, MPa | 6.8 | 5.2 |
| UE, % | 190 | 260 |

EXAMPLE 5

To demonstrate the compositions of the invention as they relate to blends containing fluoroelastomers, silicone rubbers and fluorosilicone rubbers, another series of compositions was prepared. The ACR elastomer in the blends was ACR70E. The fluoroelastomer was VITON® GLT, described by its manufacturer as a peroxide-curable, low-temperature fluoroelastomer, having a Mooney viscosity (ML-10, 121° C.) of about 90 and a specific gravity of 1.78. The silicone rubber was SILASTIC® LT-40, described by its manufacturer as a low-temperature silicone rubber with a specific gravity of 1.12. The fluorosilicone rubber was SYLON® FX 11303, described by its manufacturer as a 60-durometer fluorosilicone rubber having a specific gravity of 1.45.

A series of blends was prepared, some of which were dynamically vulcanized. Also, the fluorocarbon, silicone and fluorosilicone elastomers themselves were compared in the absence of ACR elastomer. The complete recipes are set forth in Table V. The elastomers were first combined with the filler (if any) in a Brabender mixer, removed and milled on a tight mill. Some of the blends (as indicated) were then compounded with curatives for the ACR and dynamically vulcanized at 80 rpm and 25° C. with a nitrogen blanket. Final curatives were added at a low temperature, and the compositions were cured for 10 minutes at 180° C. Physical tests were performed on the finished compositions as before. The results of the tests are set forth in Table VI.

TABLE V

| Compositions | 23 | 24 | 25 | 26 | 27 | 28 | 29 | 30 | 31 | 32 | 33 | 34 |
|---|---|---|---|---|---|---|---|---|---|---|---|---|
| ACR 70E | 50 | 50 | 40 | 40 | 40 | — | — | 40 | 40 | — | 50 | 50 |
| Viton GLT | 50 | 50 | 60 | 60 | 60 | 100 | — | — | — | — | — | — |
| Sylon FX11303 | — | — | — | — | — | — | 100 | 60 | 60 | — | — | — |
| Silastic LT-40 | — | — | — | — | — | — | — | — | — | 100 | 50 | 50 |
| N330 Black | 30 | 30 | 30 | 30 | 30 | 30 | — | — | — | — | — | — |
| Hisil 233 | — | — | — | — | — | — | — | — | — | 25 | 25 | 25 |
| Triethylene Glycol | 4 | — | 4 | — | — | — | — | 4 | — | — | 4 | — |
| Mark OTS[1] | 2 | — | 2 | — | — | — | — | 2 | — | — | 2 | — |
| Calcium Hydroxide | 8 | 8 | 4 | 4 | 4 | 4 | — | — | — | — | — | — |
| TAIC[2] | 3 | 3 | 4 | 4 | 4 | 4 | — | — | — | — | — | — |
| Lupersol 101 | 1 | 1 | 4 | 4 | 4 | 4 | 1 | 1 | 1 | 2 | 2 | 2 |
|  | 148 | 142 | 148 | 142 | 142 | 142 | 101 | 107 | 101 | 127 | 133 | 127 |

[1]Poly(dioctyl)tin maleate
[2]Triallylisocyanurate

TABLE VI

| Compositions | 35 | 36 | 37 | 38 | 39 | 40 | 41 | 42 | 43 | 44 | 45 | 46 |
|---|---|---|---|---|---|---|---|---|---|---|---|---|
| % ACR 70E | 50 | 50 | 40 | 40 | 40 | — | — | 40 | 40 | — | 50 | 50 |
| % Viton GLT (FMK) | 50 | 50 | 60 | 60 | 60 | 100 | — | — | — | — | — | — |
| % Sylon FX11303 (FWMQ) | — | — | — | — | — | — | 100 | 60 | 60 | — | — | — |
| % Silastic LT-40 (PVMQ) | — | — | — | — | — | — | — | — | — | 100 | 50 | 50 |
| N330 Black | 30 | 30 | 30 | 30 | 30 | 30 | — | — | — | — | — | — |
| Hisil 233 | — | — | — | — | — | — | — | — | — | 25 | 25 | 25 |
| Dyn. Vulcanized? | Y | N | Y | N | N | N | N | Y | N | N | Y | N |
| Hardness, Shore A | 70 | 63 | 78 | 75 | 77 | 85 | 52 | 25 | 23 | 70 | 38 | 41 |
| UTS, mpa | 6.3 | 2.4 | 12.1 | 10.2 | 11.5 | 17.9 | 13.9 | 2.1 | 2.3 | 7.7 | 4.7 | 3.1 |
| M100, mpa | 2.34 | 1.22 | 5.39 | 4.10 | 4.54 | 11.01 | 1.15 | 0.18 | 0.21 | 2.50 | 0.61 | 0.36 |
| M200, mpa | 4.53 | 1.54 | 9.49 | 7.07 | 8.28 | — | 2.38 | 0.34 | 0.28 | 4.51 | 1.59 | 0.48 |
| UE, % | 361 | 1674 | 339 | 407 | 337 | 137 | 533 | 809 | 986 | 323 | 400 | 856 |
| Tension Set | 12.5 | 21.5 | 9 | 10 | 10 | — | 5.5 | 12.5 | 10.5 | 10 | 1 | 20 |
| ASTM #3 Oil Swell Vol. % (200° C.) After 72 hrs. @ 200° C. | 9 | 13.9 | 6.4 | 7.5 | 7.7 | 3.2 | 3.5 | 10.2 | 13.7 | 37.5 | 34.5 | 43.6 |
| Hardness, Shore A | 98 | 83 | 100 | 97 | 96 | 90 | 62 | 96 | 85 | 77 | 98 | 97 |
| UTS, mpa | 6.2 | 10.6 | 20.9 | 13.6 | 14.3 | 19.4 | 8.5 | — | 2.3 | 6.4 | 5.3 | 2.3 |
| M100, mpa | — | 8.4 | — | — | 13.8 | 17.3 | 1.5 | — | — | 3.8 | — | — |
| M200, mpa | — | — | — | — | — | — | 5.5 | — | — | — | — | — |
| UE, % | 15 | 146 | 42 | 88 | 106 | 109 | 405 | — | 20 | 189 | 7 | 5 |

Although the invention has been illustrated by typical example, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An elastomeric blend comprising 10–90 parts by weight of (A) an elastomeric polymer from one or more alkyl acrylate monomers which polymer contains no crosslinking sites other than acrylate ester sites and, correspondingly, 90–10 parts by weight of (B) another elastomeric polymer which is nitrile rubber, hydrogenated nitrile rubber, or a fluoroelastomer.

2. The blend of claim 1, comprising 20–60 parts of (A) and, correspondingly, 80–40 parts of (B), wherein the alkyl acrylate monomers are ethyl acrylate or mixtures comprising ethyl acrylate and butyl acrylate.

3. The blend of claim 2 comprising 25–50 parts of (A) and, correspondingly, 75–50 parts of (B).

4. The blend of claim 3 containing curatives for (B).

5. The blend of claim 4 in which (B) is vulcanized.

6. The blend of claim 1 in which (A) is in the form of vulcanized or crosslinked particles of average diameter below 50 micrometers.

7. The blend of claim 6 comprising 25–65 parts by weight of (A) and, correspondingly, 75–35 parts by weight of (B), in which the particles of (A) have an average diameter below 20 micrometers.

8. The blend of claim 7 comprising 40–60 parts by weight of (A) and, correspondingly, 60–40 parts by weight of (B), in which the particles of (A) have an average diameter below 10 micrometers.

9. The blend of claim 7 in which (B) is nitrile rubber, hydrogenated nitrile rubber or a fluoroelastomer.

10. The blend of claim 9 in which the particles of (A) have an average diameter below 5 microns.

11. The blend of claim 6 in which (B) is nitrile rubber or hydrogenated nitrile rubber.

12. A method for preparing a millable, vulcanizable elastomeric composition by the steps of:
  i) forming a mixture comprising 10–90 parts by weight of (A) one or more elastomeric polymers from alkyl acrylate monomer which polymers contain no crosslinking sites other than acrylate ester sites, and, correspondingly, 90–10 parts by weight of (B) another elastomeric polymer which is nitrile rubber, hydrogenated nitrile rubber, a fluoroelastomer, a silicone rubber or a fluorosilicone rubber and, ii) masticating the mixture at a temperature between 140° and 240° C. in the presence of a diol for a time sufficient to achieve at least partial vulcanization of (A).

13. The method of claim 12 wherein a transesterification catalyst is present with the diol.

14. The method of claim 13 wherein the diol contains 2 to 12 carbon atoms.

15. The method of claim 14 wherein the catalyst is a metal salt.

16. The method of claim 15 wherein the diol is 1,6-hexanediol and the catalyst is selected from dibutyltin dilaurate and dibutyltin diacetate.

17. The method of claim 14 wherein the catalyst is poly(dioctyltin maleate).

18. The method of claim 14 wherein (B) is nitrile rubber, hydrogenated nitrile rubber or a fluoroelastomer.

19. The product of the method of claim 12.

* * * * *